(12) United States Patent
Li

(10) Patent No.: US 10,393,948 B2
(45) Date of Patent: Aug. 27, 2019

(54) BACKLIGHT UNIT AND DISPLAY DEVICE

(71) Applicants:BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/504,182

(22) PCT Filed: Jul. 13, 2016

(86) PCT No.: PCT/CN2016/089894
§ 371 (c)(1),
(2) Date: Feb. 15, 2017

(87) PCT Pub. No.: WO2017/071304
PCT Pub. Date: May 4, 2017

(65) Prior Publication Data
US 2017/0276865 A1 Sep. 28, 2017

(30) Foreign Application Priority Data
Oct. 29, 2015 (CN) .......................... 2015 1 0726872

(51) Int. Cl.
*F21V 21/00* (2006.01)
*F21V 8/00* (2006.01)
*G02F 1/1335* (2006.01)

(52) U.S. Cl.
CPC ......... *G02B 6/0068* (2013.01); *G02B 6/0065* (2013.01); *G02B 6/0081* (2013.01);
(Continued)

(58) Field of Classification Search
CPC .. G02B 6/0068; G02B 6/0065; G02B 6/0081; G02B 6/0088; G02B 6/0073; G02F 1/133602; G02F 1/133615
(Continued)

(56) References Cited

U.S. PATENT DOCUMENTS 7,192,177 B2 * 3/2007 Chang .................... G02B 6/009
349/58
8,648,981 B2 * 2/2014 Yu ........................ G02B 6/0055
349/61

(Continued)

FOREIGN PATENT DOCUMENTS

CN 101126862 A 2/2008
CN 101165561 A 4/2008
(Continued)

OTHER PUBLICATIONS

First Chinese Office Action dated Mar. 21, 2017; Appln. No. 201510726872.0.
(Continued)

*Primary Examiner* — Laura K Tso
(74) *Attorney, Agent, or Firm* — Ladas & Parry LLP

(57) ABSTRACT

A backlight unit includes a backplane and a light guide plate. The backplane includes a body section and a bending section connected with the body section; the body section includes a first surface and a second surface opposite to each other; the bending section includes at least a connecting portion and a mounting portion extended from the connecting portion and opposite to the first surface; the connecting portion is a bending structure along a first side of the body section; a bending direction of the connecting portion is a direction from the second surface of the body section to the first surface; the light guide plate is disposed on the first surface of the body section; one side of the mounting portion away from the connecting portion is opposite to a first end face of
(Continued)

the light guide plate; and light sources are disposed on the mounting portion. A display device is further disclosed.

15 Claims, 4 Drawing Sheets

(52) U.S. Cl.
CPC ..... *G02B 6/0088* (2013.01); *G02F 1/133602* (2013.01); *G02B 6/0073* (2013.01); *G02F 1/133615* (2013.01)

(58) Field of Classification Search
USPC .......................................................... 362/615
See application file for complete search history.

(56) References Cited

U.S. PATENT DOCUMENTS

| | | | | |
|---|---|---|---|---|
| 2008/0074902 A1* | 3/2008 | Oh | ....................... | G02B 6/0068 362/612 |
| 2009/0296423 A1* | 12/2009 | Kim | ..................... | G02B 6/0021 362/623 |
| 2012/0063163 A1* | 3/2012 | Lai | ....................... | G02B 6/0031 362/602 |
| 2014/0063787 A1 | 3/2014 | Huang et al. | | |

FOREIGN PATENT DOCUMENTS

| | | |
|---|---|---|
| CN | 201051197 Y | 4/2008 |
| CN | 202281138 U | 6/2012 |
| CN | 202598303 A | 12/2012 |
| CN | 102878495 A | 1/2013 |
| CN | 103499052 A | 1/2014 |
| CN | 204629254 U | 9/2015 |
| CN | 105202424 A | 12/2015 |
| CN | 105223732 A | 1/2016 |
| WO | 2012/102096 A1 | 8/2012 |

OTHER PUBLICATIONS

International Search Report and Written Opinion both dated Oct. 10, 2016; PCT/CN2016/089894.

* cited by examiner

BACKLIGHT UNIT AND DISPLAY DEVICE

TECHNICAL FIELD

Embodiments of the present disclosure relate to the field of display technology, in particular to a backlight unit and a display device.

BACKGROUND

The method of improving the display brightness of the display device by improving the brightness of a single light source and/or increasing the number of light sources will result in the increased heat output of the light source or the light sources. If the heat cannot be dissipated out in time, the temperature of the light source(s) and areas near the light source(s) will be raised, so that the service life of the light source(s) can be affected, and other adjacent optical components can be deformed. For instance, in a display device which takes light-emitting diodes (LEDs) as light sources, when the brightness of the LEDs is higher than lumen (Lm), after the LEDs are lightened at a rated current and operate for a period of time, local temperature around the LEDs will be gradually raised and exceed 55° C. Once the temperature of the LEDs is higher than 55° C., a light guide plate (LGP) and a reflector plate making tight contact with the LEDs may produce irreversible bending deformation due to high temperature. In addition, if the number of the LEDs in a light bar is larger, the accumulated heat energy is larger, and hence the possibility of adverse effects is higher.

SUMMARY

One aspect of the present disclosure provides a backlight unit. The backlight unit comprises a backplane and a light guide plate (LGP); the backplane includes a body section a bending section connected with the body section; the body section includes a first surface a second surface opposite to each other; the bending section includes at least a connecting portion and a mounting portion extended from the connecting portion and opposite to the first surface; the connecting portion is a bending structure along a first side of the body section; a bending direction of the connecting portion is a direction from the second surface of the body section to the first surface; the LGP is disposed on the first surface of the body section; one of the mounting portion away from the connecting portion is opposite to a first end face of the LGP; and light sources are disposed on the mounting portion.

For example, a first zigzag structure is provided on one side of the mounting portion provided with the light sources; and a size of notches of the first zigzag structure matches with a size of the light sources.

For example, the mounting portion includes a bonding surface opposite to the first surface; the plurality of light sources are disposed on one side of the mounting portion provided with the first zigzag structure, and are sequentially arranged on a light bar; the light bar is bonded to the bonding surface of the mounting portion; and the plurality of light sources are sequentially arranged along the notches of the first zigzag structure.

For example, the connecting portion is in a flat plate structure or a cambered plate structure which is perpendicular to the first surface along the first side of the body section; and the mounting portion is in a flat plate structure parallel to the first surface.

For example, a width D1 of the notches of the first zigzag structure satisfies $3.2 \leq D1 \leq 4.4$.

For example, the mounting portion is parallel to the first surface; and a distance H1 between the first surface and one side of the mounting portion away from the first surface satisfies $0.4 \leq H1 \leq 0.6$.

For example, a depth K3 of the notches of the first zigzag structure satisfies $0.8 \leq K3 \leq 1.3$.

For example, a distance K2 from one side of the mounting portion, which side is away from the connecting portion, to the connecting portion satisfies $1.3 \leq K2 \leq 2.0$.

For example, the bending section and the body section are of an integrated structure.

For example, the bending section and the body section are of an integrated structure.

For example, the LGP is in a wedge structure; a thickness of the first end face of the LGP is greater than that of a second end face of the LGP; and the first end face and the second end face are disposed on both sides of the LGP.

For example, a first space is defined by the connecting portion, the mounting portion and the first surface.

For example, the backlight unit further comprises sealant, the sealant at least includes a bearing portion matching with the first space; the bearing portion includes a second zigzag structure; and the shape of the second zigzag structure matches with that of the first zigzag structure.

For example, a width D2 of notches of the second zigzag structure and a width D1 of the notches of the first zigzag structure satisfy $D2 \geq D1$.

For example, a depth K5 of the notches of the second zigzag structure and a depth K3 of the notches of the first zigzag structure satisfy $K5 \leq K3$.

For example, the light sources are light-emitting diodes (LEDs).

For example, the backplane is made from aluminum, aluminum alloy or steel.

Another aspect of the present disclosure provides a display device comprising any one of the foregoing backlight units.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
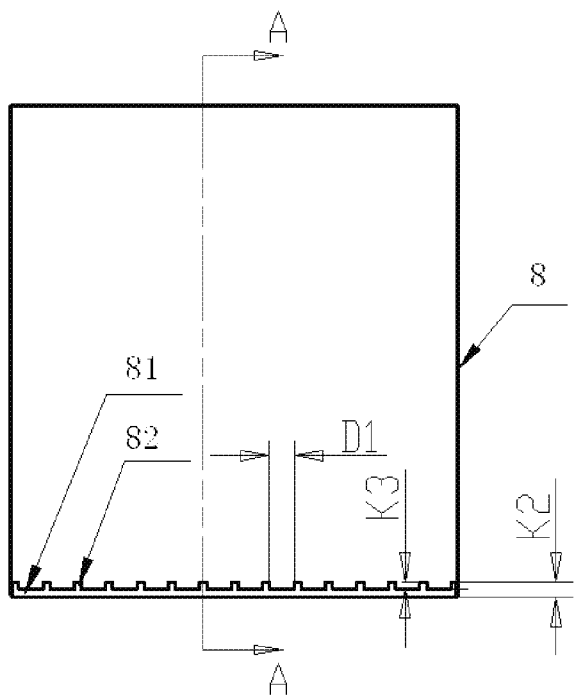
FIG. 1a is a schematic structural view of a backplane in an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In an edge type display device, a backlight unit, for instance, may comprise a backplane and a light guide plate (LGP) disposed on one side of the backplane; a reflector plate and the like are disposed between the LGP and the backplane; optical films are disposed on one side of the LGP away from the backplane; the optical films include, for instance, a diffuser plate, a lower prism or an upper prism; one side of the optical film, for instance, may also be provided with a light-shielding adhesive tape; an outer edge encircling the backplane is, for instance, provided with sealant with a specific thickness; and the sealant is arranged so as to fix the optical components from the periphery. The sealant is generally made from a non-metallic material such as rubber and resin. Light sources are oppositely arranged on an end face on one side of an incident section of the LGP. The light sources may be disposed on the sealant. If the light sources are disposed on the sealant, the heat produced by the light sources cannot be effectively discharged in time, so that the service life of the light sources can be disadvantageously affected. In addition, the heat produced by the light sources, for instance, can result in the deformation of the optical components such as the LGP and the reflector plate.

An embodiment of the present disclosure provides a backlight unit, which comprises a backplane and an LGP, wherein the backplane includes a body section and a bending section connected with the body section; the body section includes a first surface and a second surface opposite to each other; the bending section includes at least a connecting portion and a mounting portion extended from the connecting portion and opposite to the first surface; the connecting portion is a bending structure along a first side of the body section; the bending direction of the connecting portion is the direction from the second surface of the body section to the first surface; the LGP is disposed on the first surface of the body section; one side of the mounting portion away from the connecting portion is opposite to a first end face of the LGP; and light sources are disposed on the mounting portion.

The backplane is, for instance, a heat-conducting piece, e.g., a component made from a metallic material such as aluminum, aluminum alloy or steel. For instance, one layer of copper may also be plated on a surface of a metallic aluminum component to improve the thermal conductivity. The light source is, for instance, an LED. The first end face of the LGP is an incident surface of the LGP. The backlight unit provided by the embodiment of the present disclosure, for instance, may improve the radiating efficiency of the light sources and prolong the service life of the light sources, and may also protect optical components near the light sources from being deformed due to the accumulated heat output from the light sources.

It should be know by those skilled in the art that the LGP is oppositely arranged on the first surface of the body section of the backplane. The connecting portion, for instance, may be the bending structure opposite to the first side of the body section, and the bending direction is, for instance, the direction towards one side of the first surface. For instance, the connecting portion and the first surface of the body section of the backplane are at certain included angle. For instance, the connecting portion is perpendicular to the first surface of the body section of the backplane. The connecting portion, for instance, may be a structure formed by repeated bending on one side of the backplane; for instance, a stepped shape is formed on a side surface. The connecting portion, for instance, may also be a structure formed by repeating the process for a plurality of times: the backplane is bent along the direction from the second surface to the first surface at first, and hence bent towards the first surface and attached to the first surface. The structural stability and the heat dissipation effect of the bending section can be simultaneously improved by increasing the contact area of the connecting portion and different positions of the first surface. The mounting portion shall include a part which is extended opposite to the first surface of the body section, and the light sources are mounted in the part of the mounting portion. The mounting portion, for instance, may be parallel to the first surface or at certain included angle. The mounting portion includes a bonding surface opposite to the first surface, and a light bar of LEDs or the like is bonded to the bonding surface. The forming means of the bending section, for instance, may also be that the bending section is formed simultaneously when the backplane is formed, namely the bending section and the body section of the backplane are in an integrated structure which is simultaneously formed. The bending section, for instance, may also be independently formed at first and hence assembled together with the body section of the backplane.

Figure 1B:
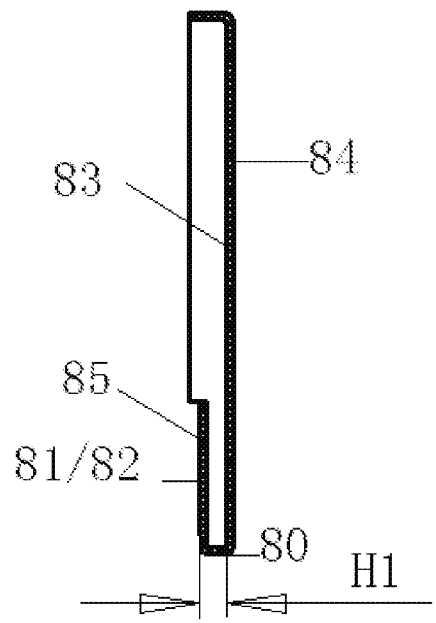
FIG. 1b is a sectional view of FIG. 1a along line A-A.

In one embodiment, the bending section of the backplane, for instance, may be a structure formed by bending of the backplane twice, on one side of the backplane, towards one side provided with the LGP, as illustrated in FIGS. 1a and 1b, in which FIG. 1a is a schematic structural view of a backplane provided by one embodiment of the present disclosure, and FIG. 1b is a sectional view of FIG. 1a along line A-A. In addition, thick lines in FIG. 1b represent a backplane 8, and thin lines, for instance, represent an LGP disposed on a first surface 83 of the backplane 8. As illustrated in FIGS. 1a and 1b, after double bending of the backplane 8, a bending section of the backplane 8 is formed by a bent part of the backplane 8. The bending section includes a connecting portion 80 and a mounting portion 81. The connecting portion 80 is connected with a first side of the backplane 8 and is basically perpendicular to the first surface 83 of the backplane 8. The mounting portion 81 is used for mounting light sources and is basically parallel to the first surface 83. The light sources shall be arranged opposite to an incident section of the LGP. FIG. 1b also illustrates a second surface 84 of the backplane 8 opposite to the first surface 83. The connecting portion 80 as illustrated in the figure is a part of the backplane formed by first-time bending on one side of the backplane, and the mounting portion 81 as illustrated in the figure is a part formed by second-time bending on the basis of first-time bending.

In one embodiment, the bending section of the backplane is formed by double bending, and a zigzag structure is formed on one side of the mounting portion away from the connecting portion. Continuing to refer to FIGS. 1a and 1b, as described above, the backplane 8 includes a body section and a bending section; the bending section includes a mounting portion 81; the mounting portion 81 is basically parallel to a first surface 83 of the backplane 8; and the connecting portion 80 is basically perpendicular to the first surface 83. The width of the mounting portion 81 (namely the distance from one side of the mounting portion, which side is away from the connecting portion, to the connecting portion) should better not affect the size of a display region. The mounting portion 81 includes a bonding surface 85 opposite to the first surface 83. A first zigzag structure 82 is disposed on one side of the mounting portion 81 provided with the light sources. The size of each notch in the first zigzag structure 82 matches with the size of correspondingly mounted light source, which is as described below: a plurality of light sources are sequentially disposed on, for instance, an elongated light bar; the light bar is bonded to the bonding surface 85 of the mounting portion 81; and the plurality of light sources are sequentially arranged along the notches of the first zigzag structure 82. As the light bar is bonded to the bonding surface 85 of the mounting portion 81, the contact area of the light bar and the mounting portion 82 can be effectively increased, and hence the heat dissipation effect of the light sources in the backlight unit can be improved.

In one embodiment of the present disclosure, the size of the notch of the first zigzag structure may be optimized. For instance, the three types of LED light sources used in the current smart mobile phones include 3.8×1.0×0.6, 3.0×1.0× 0.5 and 3.0×0.8×0.4 (length ×width×height, unit mm). Thus the size of the connecting portion, the mounting portion and the notch may be optimized according to the size of the three types of LEDs. Continuing to refer to FIG. 1a, the mounting portion 81 is parallel to the first surface 83, and the connecting portion 80 is perpendicular to the first surface 83. For instance, the width D1 of the notch of the first zigzag structure 82 satisfies 3.2 mm≤D1≤4.4 mm; for instance, the distance H1 between the first surface 83 and one side of the mounting portion 81 away from the first surface 83 satisfies 0.4 mm≤H1≤0.6 mm; for instance, the depth K3 of the notch of the first zigzag structure 82 satisfies 0.8 mm≤K3≤1.3 mm; and for instance, the distance K2 from one side of the mounting portion 81 away from the connecting portion 80 to the connecting portion 80 satisfies 1.3 mm≤K2≤2.0 mm. The distance K2 is mainly selected on the basis of the theoretical foundation of the maximum incident distance (the distance from a luminous surface of the LED to a window in a light-shielding adhesive tape) and the maximum visible range; one value which gives attention to two aspects is selected; the value is specifically determined according to actual design requirement; and generally, the incident distance is ranged from 0.28 mm to 0.32 mm. As for a display device adopting other types of LEDs, the size of the connecting portion, the mounting portion and the first zigzag structure may be correspondingly adjusted. As the size of the connecting portion, the mounting portion and the notch is optimized, the LEDs can be better matching with the mounting portion, so that the heat dissipation effect can be effectively improved when ensuring the safe operation of the light sources.

Figure 2A:
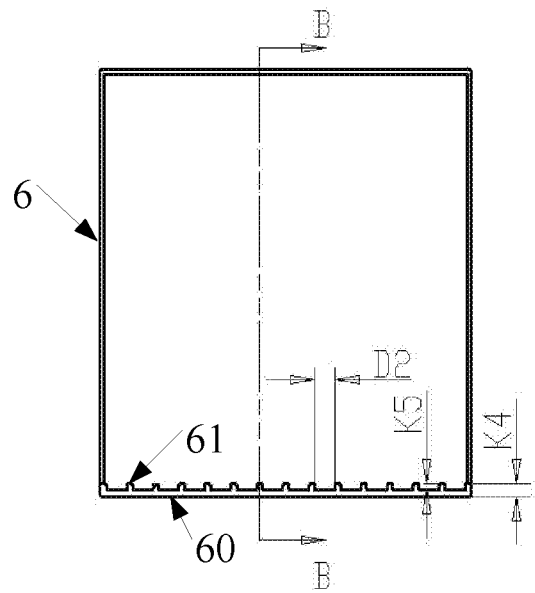
FIG. 2a is a schematic structural view of sealant in an embodiment of the present disclosure.
Figure 2B:
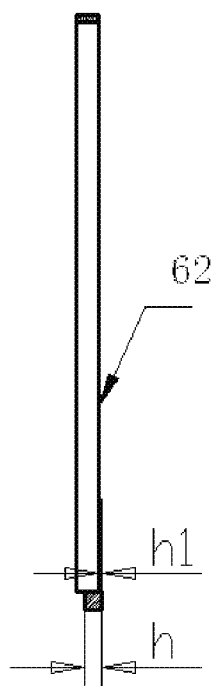
FIG. 2b is a sectional view of FIG. 2a along line B-B.

In another embodiment of the present disclosure, the bending section of the backplane is formed by double bending as described above. A first space is defined by the connecting portion 80, the mounting portion 81 and the first surface 83 of the backplane together. The first space may affect the bearing strength of the bending section. As illustrated in FIGS. 2a and 2b, one part of sealant may be designed to be of a structure matching with the first space. FIG. 2a is a schematic structural view of the sealant in the embodiment of the present disclosure, and FIG. 2b is a sectional view of FIG. 2a along line B-B. As illustrated in FIG. 2a, a plan view of sealant 6 in the backlight unit is basically a rectangular hollow structure, so that the optical components (including the LGP) can be fixed by the sealant 6 from the periphery. The sealant 6 is fixed on an outer edge of the first surface 83 of the backplane 8 in three directions via a double-faced adhesive tape. The sealant 6 also includes a bearing portion 60 matching with the first space; a second zigzag structure 61 is disposed on one side of the bearing portion 60; the shape of the second zigzag structure 61 matches with that of the first zigzag structure 82; the bearing portion 60 is inserted into the first space to improve the bearing strength of the bending section of the backplane 8; and the second zigzag structure 61 matches with the first zigzag structure 82 to ensure smooth mounting of the light sources such as the LEDs.

In one embodiment of the present disclosure, the size of the second zigzag structure 61 may be optimized. Continuing to refer to FIG. 2a, the width D2 of notches of the second zigzag structure 61 and the width D1 of the notches of the first zigzag structure 82 satisfies D2≥D1, so that the distance between both ends of the light source and both sides of the notch of the first zigzag structure 82 can be closer, and hence the heat dissipation effect can be improved. For instance, the depth K5 of the notch of the second zigzag structure 61 and the depth K3 of the notch of the first zigzag structure 82 satisfies K5≤K3; and for instance, the distance K4 from the outside of the second zigzag structure 61 to the other side of the bearing portion 60 and the distance K2 from the outside of the first zigzag structure 82 to the connecting portion 80 satisfies K4≥K2. As illustrated in FIG. 2b, wherein, h refers to the thickness of a fitting part of the backplane; in order to ensure that the bearing portion 60 can be inserted into the first space, "h≤H1−thickness of materials of backplane" shall be guaranteed; for instance, "h=H1−thickness of materials of backplane" is designed, so that the bearing portion 60 can be tightly bonded to the first space, and hence the structural stability can be improved; and for instance, a certain gap is formed between the bearing portion 60 and the mounting portion 81 and between the bearing portion 60 and the connecting portion 80, and the gap, for instance, may be 0.01 mm-0.05 mm, so that the heat dissipation effect at the fitting part of the bending section and the bearing portion 60 can be improved. A bottom surface 62 of the sealant is fixed on the backplane 8 through an adhesive tape. The bottom surface 62 of the sealant adopts submergence design, and the submergence depth h1 is equal to the thickness of the fixing adhesive tape. The optional fixing adhesive tape, for instance, includes two specifications. The thickness of the fixing adhesive tape with the two specifications is respectively 0.05 mm and 0.06 mm. The submergence design of the bottom surface 62 of the sealant ensures that the sealant is tightly bonded to the backplane close to one side of the backplane after being fixed on the backplane through the fixing adhesive tape, so that the structural stability can be improved.

Figure 3A:
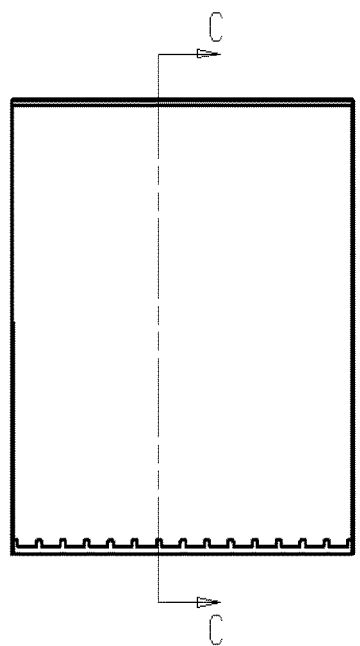
FIG. 3a is a schematic diagram illustrating the assembly of sealant and a backplane including an LGP and a reflector plate in an embodiment of the present disclosure.
Figure 3B:
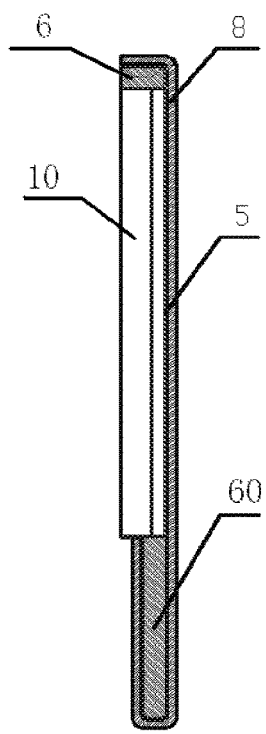
FIG. 3b is a sectional view of FIG. 3a along line C-C.

FIG. 3a is a schematic diagram illustrating the matching between the sealant and the backplane, and FIG. 3b is a schematic diagram of FIG. 3a along line C-C. As illustrated in FIGS. 3a and 3b, a plan view of the sealant 6 is a rectangular hollow structure. The sealant 6 is fixed on the first surface 83 along an edge of the first surface 83 of the body section of the backplane 8; one end of the sealant 6 provided with the bearing portion 60 is inserted into the first space; and the bearing portion 60 is tightly matching with the first space. The shape and the size of the second zigzag structure 61 of the sealant 6 match with the shape and the size of the first zigzag structure 82 of the bending section of the backplane. FIG. 3b illustrates the relative position of a reflector plate 5 and an LGP 10; the LGP 10 is disposed on one side of the first surface 83 of the body section of the backplane; and the reflector plate 5 is bonded to one side of the LGP 10 close to the first surface 83. The inside of the sealant 6 abuts against outer edges of both the LGP 10 and the reflector plate 5. Light sources (not shown in the figure) are disposed on one side of an end face (the end face is an incident surface of the LGP) of the bending section opposite to the LGP 10.

Figure 4A:
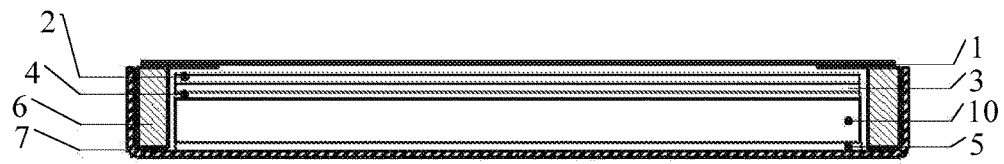
FIG. 4a is a schematic sectional view of a part between an incident section and a luminous section of the backlight unit provided by an embodiment of the present disclosure along the direction perpendicular to line A-A of the backplane.
Figure 4B:
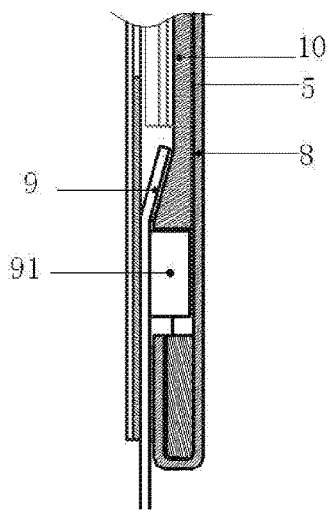
FIG. 4b is a schematic sectional view of the incident section of the backlight unit provided by an embodiment of the present disclosure along line A-A of the backplane.
Figure 4C:
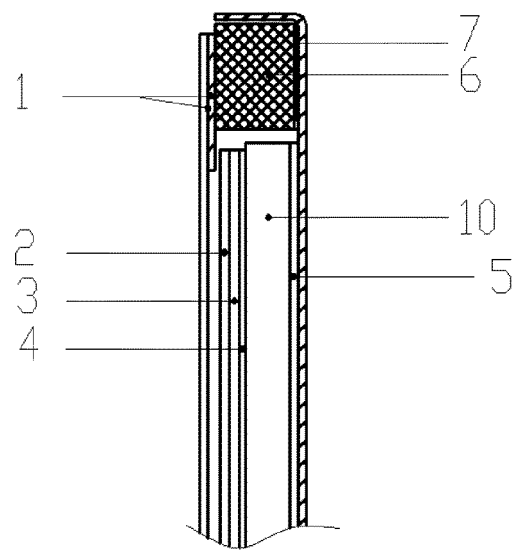
FIG. 4c is a schematic sectional view of the luminous section of the backlight unit provided by an embodiment of the present disclosure along line A-A of the backplane.

FIGS. 4a to 4c are schematic structural views of a backlight unit provided by one embodiment of the present disclosure. FIG. 4a is a schematic sectional view of a part of the backlight unit between an incident portion and a luminous portion along the direction perpendicular to line A-A (as illustrated in FIG. 1a) of the backplane; FIG. 4b is a schematic sectional view of the incident portion of the backplane along line A-A of the backplane; and FIG. 4c is a schematic sectional view of the luminous portion of the backplane along line A-A of the backplane.

As illustrated in FIG. 4a, a reflector plate 5, an LGP 10, a diffuser plate 4, a lower prism 3, an upper prism 2 and light-shielding adhesive tapes 1 are sequentially arranged on the first surface 83 of the body section of the backplane. Sealant 6 is disposed at an edge of the first surface 83 of the backplane 8, and a bottom surface of the sealant 6 is fixed on the first surface 83 of the backplane 8 through a fixing adhesive tape 7.

As illustrated in FIG. 4b, the LGP 10 is disposed on one side of the first surface 83 of the body section of the backplane; the reflector plate 5 is bonded to one side of the LGP 10 close to the backplane; and optical films such as the diffuser plate 4, the lower prism 3 and the upper prism 2 are sequentially disposed on the other side. The backplane 8 includes a bending section; the bending section includes a connecting portion 80 which is basically perpendicular to the first surface 83 of the backplane, and a mounting portion 81 parallel to the first surface 83; and LEDs 91 are mounted on one side of the mounting portion 81 away from the connecting portion 80 and are arranged facing an end face (incident surface) of the LGP 10. The LEDs 91 are sequentially arranged on a light bar 9 which is bonded to a bonding surface of the mounting portion 81 opposite to the first surface 83. The light bar 9 may include, for instance, an elongated printed circuit board (PCB) and light sources sequentially arranged on this PCB.

As described above, a first space is defined by the connecting portion 80, the mounting portion 81 and the first surface 83 opposite to the mounting portion 81 together. As illustrated in FIG. 4b, a bearing portion 60 of the sealant 6 is inserted into the first space (as different from bottom surfaces of the sealant in other three directions, one side of the bearing portion close to the first surface of the backplane may also be not fixed through the fixing adhesive tape), so that the bearing strength of the bending section can be improved. For instance, a first zigzag structure 82 is disposed on one side of the mounting portion 81 away from the connecting portion 80; and the bearing portion 60 of the sealant 6 includes a second zigzag structure 61 matching with the first zigzag structure 82. After the light bar 9 is bonded to the bonding surface of the mounting portion 81, a plurality of LEDs 91 are just disposed in notches of the first zigzag structure 82.

In the embodiment, as illustrated in FIG. 4b, one side of the LGP 10 close to the bending section is in a wedge structure of which the thickness is gradually reduced from one side of the LGP 10 close to the bending section of the backplane to one side of the LGP away from the bending section of the backplane, so that the amount of incident light of the LGP can be increased, and hence the brightness of the backlight unit can be improved. As illustrated in FIG. 4b, one part of the light bar is bonded to the outside of the wedge structure of the LGP 10, so that the stability of the light bar can be improved. The light-shielding adhesive tape 1 may also cover one side of the backlight unit away from the backplane, so that the light leakage of the backlight unit can be avoided, and hence the display brightness of corresponding display device can be improved.

As illustrated in FIG. 4c, a reflector plate 5, an LGP 10, a diffuser plate 4, a lower prim 3, an upper prism 2 and light-shielding adhesive tapes 1 are sequentially arranged on the first surface of the body section of the backplane. One end of the LGP 10 and other optical film(s) away from the bending section is fixed through sealant 6, and a bottom surface of the sealant 6 is fixed on the backplane 8 through a fixing adhesive tape 7.

An embodiment of the present disclosure further provides a display device comprising the foregoing backlight unit. The display device has the advantages of good heat dissipation effect, long service life of light sources and higher display brightness.

In this text, the terms "first", "second" and the like are only used for distinguishing one entity or operation from another entity or operation and do not indicate or imply any relationship or sequence between the entities or operations. The terms "comprise", "include" and the like are open expression and do not exclude other elements in the process, method and object.

It should be also noted that the orientation or position relationship indicated by "on", "beneath" and the like is based on the orientation or position relationship as illustrated in the accompanying drawings, are only used for convenient description of the present disclosure and simplified description, do not indicate or imply that the referred device or element must have specific orientation and be constructed and operated in specific orientation, and hence should not be construed as the limitation of the present disclosure.

Unless otherwise specified, the terms "arranged", "connected" and "connection" should be understood in a broad sense, for instance, may refer to fixed connection and may also refer to detachable connection or integrated connection; may refer to mechanical connection and may also refer to electrical connection; may refer to direct connection and may also refer to indirect connection through an intermediate medium; and may refer to the communication of the inside of two elements. The specific meaning of the terms in the present disclosure shall be understood by those skilled in the art according to specific conditions.

The above preferred embodiments may be mutually combined, do not depart from the scope of the present disclosure, and can obtain better combination effect.

The application claims priority to the Chinese patent application No. 201510726872.0, as filed Oct. 29, 2015, the disclosure of which is incorporated herein by reference as part of the application.

What is claimed is:

1. A backlight unit, comprising a backplane and a light guide plate (LGP), wherein
the backplane includes a body section and a bending section connected with the body section in an integrated structure;
the body section includes a first surface and a second surface opposite to each other; the bending section includes at least a connecting portion and a mounting portion extended from the connecting portion and opposite to the first surface;

the connecting portion is a bending structure along a first side of the body section; a bending direction of the connecting portion is a direction from the second surface of the body section to the first surface;

the LGP is disposed on the first surface of the body section;

one side of the mounting portion away from the connecting portion is opposite to a first end face of the LGP; and light sources are disposed on the mounting portion;

wherein a first zigzag structure is provided on one side of the mounting portion provided with the light sources; and a size of notches of the first zigzag structure matches with a size of the light sources;

wherein a first space is defined by the connecting portion, the mounting portion and the first surface;

the backlight unit further comprising sealant, wherein the sealant at least includes a bearing portion matching with and provided in the first space; the bearing portion includes a second zigzag structure; and a shape of the second zigzag structure matches with that of the first zigzag structure;

wherein a width D2 of notches of the second zigzag structure and a width D1 of the notches of the first zigzag structure satisfy D2≥D1.

2. The backlight unit according to claim 1, wherein the mounting portion includes a bonding surface opposite to the first surface;

the plurality of light sources are disposed on one side of the mounting portion provided with the first zigzag structure, and are sequentially arranged on a light bar;

the light bar is bonded to the bonding surface of the mounting portion; and the plurality of light sources are sequentially arranged along the notches of the first zigzag structure.

3. The backlight unit according to claim 1, wherein the connecting portion is in a flat plate structure or a cambered plate structure which is perpendicular to the first surface along the first side of the body section; and the mounting portion is in a flat plate structure parallel to the first surface.

4. The backlight unit according to claim 2, wherein a width D1 of the notches of the first zigzag structure satisfies 3.2 mm≤D1≤4.4 mm.

5. The backlight unit according to claim 4, wherein the mounting portion is parallel to the first surface; and a distance H1 between the first surface and one side of the mounting portion away from the first surface satisfies 0.4 mm≤H1≤0.6 mm.

6. The backlight unit according to claim 5, wherein a depth K3 of the notches of the first zigzag structure satisfies 0.8 mm≤K3≤1.3 mm.

7. The backlight unit according to claim 1, wherein a distance K2 from one side of the mounting portion, which side is away from the connecting portion, to the connecting portion satisfies 1.3 mm≤K2≤2.0 mm.

8. The backlight unit according to claim 1, wherein the bending section and the body section are of an integrated structure.

9. The backlight unit according to claim 7, wherein the bending section and the body section are of an integrated structure.

10. The backlight unit according to claim 1, wherein the LGP is in a wedge structure;

a thickness of the first end face of the LGP is greater than that of a second end face of the LGP; and the first end face and the second end face are disposed on both sides of the LGP.

11. The backlight unit according to claim 1, wherein a depth K5 of the notches of the second zigzag structure and a depth K3 of the notches of the first zigzag structure satisfy K5≤K3.

12. The backlight unit according to claim 1, wherein the light sources are light-emitting diodes (LEDs).

13. The backlight unit according to claim 1, wherein the backplane is made from aluminum, aluminum alloy or steel.

14. A display device comprising the backlight unit according to claim 1.

15. The display device according to claim 1, wherein the mounting portion includes a bonding surface opposite to the first surface;

the plurality of light sources are disposed on one side of the mounting portion provided with the first zigzag structure, and are sequentially arranged on a light bar;

the light bar is bonded to the bonding surface of the mounting portion; and the plurality of light sources are sequentially arranged along the notches of the first zigzag structure.

* * * * *